United States Patent [19]

Grohn et al.

[11] Patent Number: 4,754,738
[45] Date of Patent: Jul. 5, 1988

[54] PRESSURE OIL FEED ARRANGEMENT FOR A HYDRAULICALLY ACTUATED TIMING DEVICE COOPERATING WITH AN INJECTION PUMP

[75] Inventors: Michael Grohn, Waiblingen; Frank Thoma, Stuttgart; Wilhelm Tonhaeuser, Korb, all of Fed. Rep. of Germany

[73] Assignee: Daimler-Benz Aktiengesellschaft, Stuttgart, Fed. Rep. of Germany

[21] Appl. No.: 897,343

[22] Filed: Aug. 18, 1986

[30] Foreign Application Priority Data

Aug. 16, 1985 [DE] Fed. Rep. of Germany ....... 3529426
Dec. 6, 1985 [DE] Fed. Rep. of Germany ....... 3543151

[51] Int. Cl.$^4$ ............................................. F02M 39/00
[52] U.S. Cl. ..................................... 123/502; 123/500
[58] Field of Search .................. 123/502, 357–359, 123/458, 501, 500

[56] References Cited

U.S. PATENT DOCUMENTS

| 3,815,564 | 6/1974 | Suda | 123/502 |
|---|---|---|---|
| 4,417,554 | 11/1983 | Dinger | 123/502 |
| 4,489,698 | 12/1984 | Hofer | 123/502 |
| 4,493,302 | 1/1985 | Kawamura | 123/502 |
| 4,527,531 | 7/1985 | Koyanagi | 123/501 |
| 4,541,393 | 9/1985 | Sato | 123/501 |

FOREIGN PATENT DOCUMENTS

| 1258181 | 10/1964 | Fed. Rep. of Germany | 123/500 |
|---|---|---|---|
| 2932672 | 2/1981 | Fed. Rep. of Germany | 123/500 |
| 0068536 | 4/1982 | Japan | 123/502 |

Primary Examiner—Carl Stuart Miller
Attorney, Agent, or Firm—Barnes & Thornburg

[57] ABSTRACT

A pressure oil supply arrangement for a hydraulically actuated timing device cooperating with an injection pump for the control of the injection start in multi-cylinder, air-compressing injection internal combustion engines, with an electromagnetic control unit for the control of the pressure oil inlet or return in a feed line in communication with the timing device; the electromagnetic control unit is thereby controllable by an electronic control apparatus in dependence on operating parameters of the internal combustion engine and the connection to the timing device is adapted to be interrupted by the control unit during each injection operation.

11 Claims, 4 Drawing Sheets

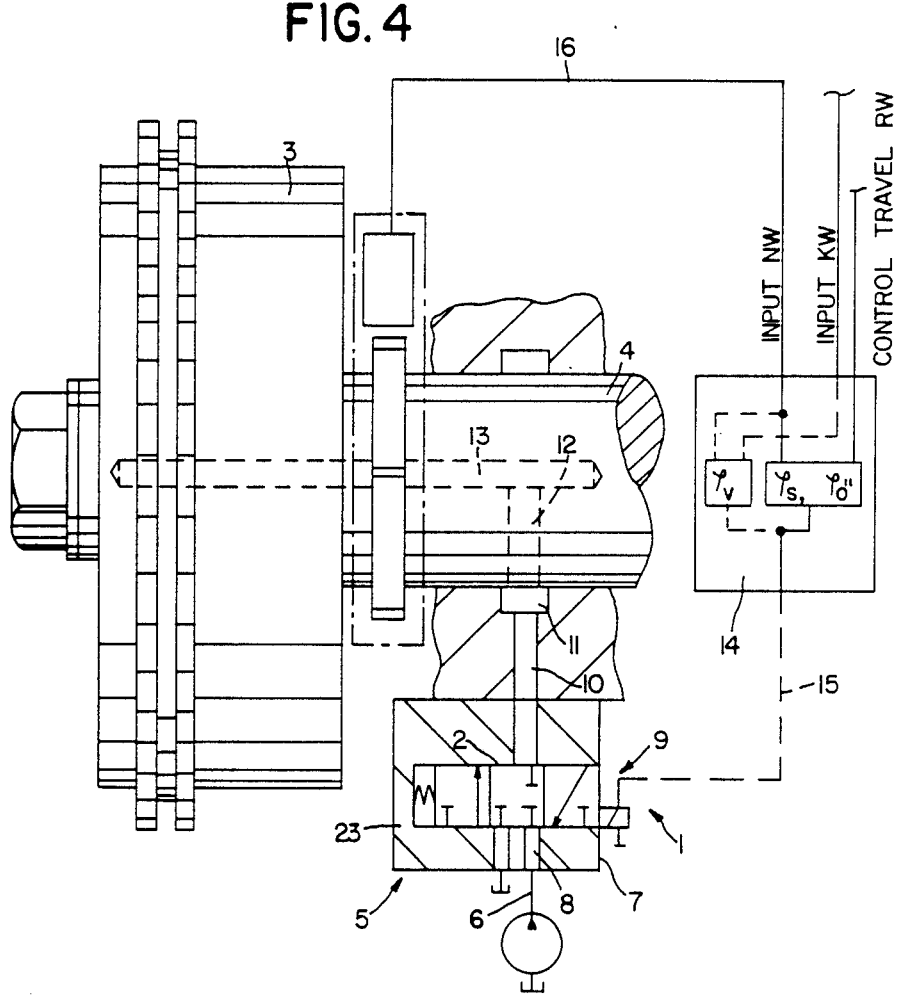
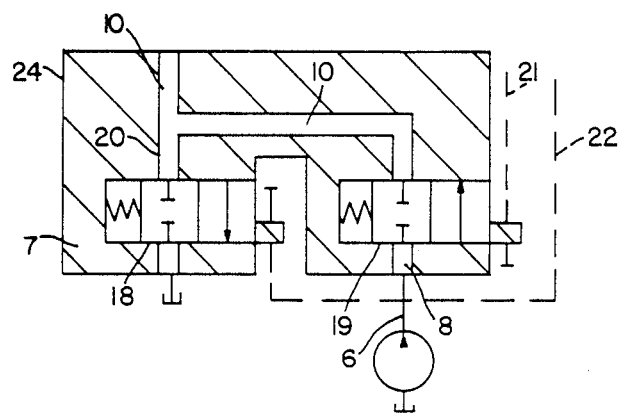

PRESSURE OIL FEED ARRANGEMENT FOR A HYDRAULICALLY ACTUATED TIMING DEVICE COOPERATING WITH AN INJECTION PUMP

The present invention relates to a hydraulic pressure oil supply arrangement for a hydraulically actuated timing device cooperating with an injection pump for the control of the start of injection in multi-cylinder, air-compressing internal combustion engines, especially in multi-cylinder, air-compressing internal combustion engines with direct injection.

A hydraulic supply arrangement for a hydraulic timing device is described in the DE-OS No. 29 32 672, in which an electronic control apparatus operating in dependence on operating parameters of the internal combustion engine controls a control unit as 3/3-directional-solenoid control valve whose shifting positions are intended for the pressure oil inlet and return as well as for the closing-off of the pressure oil connection to the timing device. The shut-off, respectively, closure position is thereby always engaged in those cases when the timing device remains in the given position, i.e., if the adjusting angle between primary and second part is neither reduced nor enlarged.

It is known that with hydraulically actuated timing devices, the effective engaging surface of an adjusting element is located in the timing device rotating with the pump rotational speed. The effective engaging surface and the actuating pressures must be designed thereby for the torque peaks which ar produced during the injection phase, properly speaking. The necessary peak moment is thereby a multiple of the average driving torque.

The present invention is concerned with the task to provide, compared to the prior art constructions, an improved pressure oil supply arrangement for a hydraulically actuated timing device providing for a multi-cylinder internal combustion engine, for which the actuating pressures can be designed approximately to the average driving torques.

The underlying problems are solved according to the present invention in that also with an adjustment of the start of injection the control unit again assumes the closure position in each operating cycle of the internal combustion engine, after an adjustment to a shifting position corresponding to the pressure oil supply or pressure oil return, at the latest with the beginning of the injection operation and remains in this position during the entire injection operation whereby, starting from the secondary pulse, the closure duration is a function of rotational speed and/or load.

Due to the fact that the connection at the overflow from the pressure oil supply to the bore arrangement is maintained exclusively between the respective injection operations but is interrupted during each injection operation over a predetermined variable range of the rotational angle as a function of engine operating magnitudes and no hydraulic medium can flow to or from the timing device, the actuating pressures need no longer be designed for such timing devices to the high torque peaks during the injection phase, properly speaking.

A closure device provided for an injection start adjusting device is disclosed in the DE-AS No. B 12 58 181, in which, however, a cyclically controlled slide valve member interrupts a working line leading to the adjusting member for the adjustment of the instant of time of the injection. With this construction, the admission of the slide valve member is unequivocally dependent on the spool-type piston cooperating with the pump piston. The measures taken in this case require a not-inconsiderable structural expenditure and permit no degrees of freedom between the injection phases.

With the electromagnetic control unit used with the present invention and consisting of one or two control members, the base position is the closure position in which during the injection phase, the return moment from the injection pump to the timing device can be decoupled in a simple manner. The supply or return position can be controlled at will from this base position.

These and other objects, features and advantages of the present invention will become more apparent from the following description when taken in connection with the accompanying drawing which shows, for purposes of illustration only, several embodiments in accordance with the present invention, and wherein.

Figure 6:
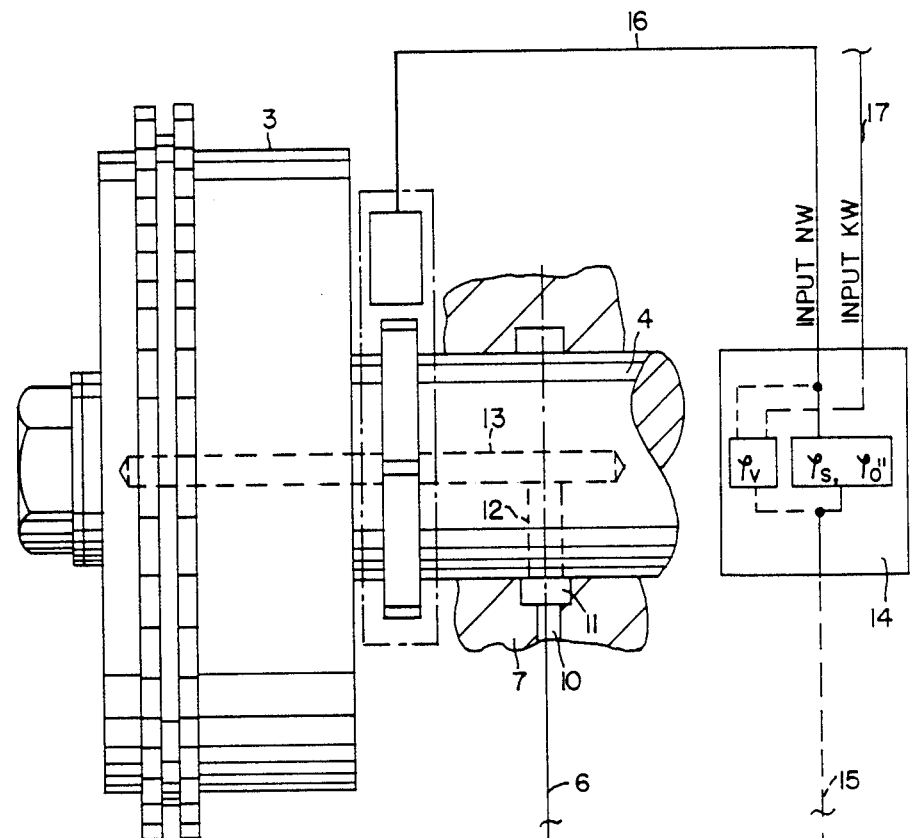
Figure 7:
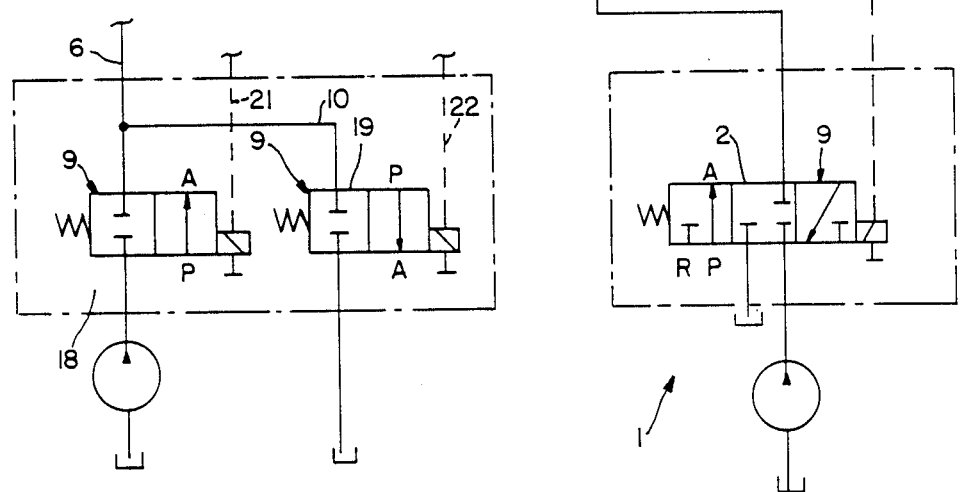

FIGS. 4 and 5 are somewhat schematic views, partially in cross section, of two further modified embodiments in accordance with the present invention in which the embodiment with the 3/3-directional-solenoid control valve and the embodiment with the 2/2-directional-solenoid control valve are each flangedly connected at the pump housing; and FIGS. 6 and 7 are schematic views of two still further embodiments in accordance with the present invention with solenoid valves arranged in the external line section of the feed line.

Figure 1:
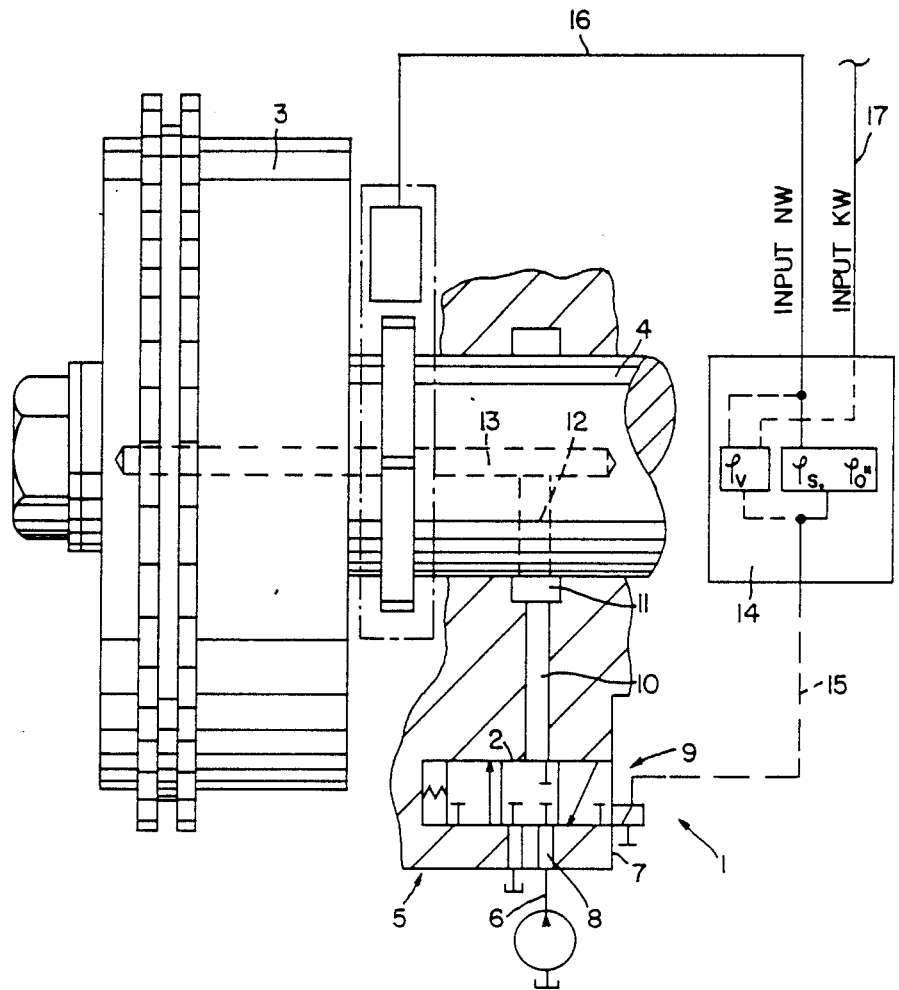
FIG. 1 is a somewhat schematic elevational view, partly in cross section, of one embodiment of a pressure oil feed arrangement for a hydraulically actuated timing device in accordance with the present invention with a 3/3-directional-solenoid control valve controllable by an electronic control apparatus and integrated in the pump housing of the injection pump.

Referring now to the drawing wherein like reference numerals are used throughout the various views to designate like parts, in the pressure oil supply arrangement generally designated by reference numeral 1 which is illustrated in FIG. 1 and which includes a closure device 2 for decoupling driving and adjusting torque for a hydraulically actuated timing device 3 that is supported on the pump shaft 4 of an injection pump generally designated by reference numeral 5 provided for multi-cylinder injection internal combustion engines, an oil stream is branched off from the oil circulation of the internal combustion engine and is conducted through a freely exposed feed line 6 as well as through a pressure oil channel 8 arranged in the pump housing 7 to an electromagnetically actuatable control unit generally designated by reference numeral 9 and accommodated in the pump housing 7, from there the oil stream flows by way of a feed channel 10 into an annular groove 11 in the pump housing 7, and further by way of a radial bore 12 and a centrally extending axial bore 13 in the pump shaft 4 to the timing device 3.

The control unit 9 which includes the closure device 2 is formed by an electrically controllable adjusting member as 3/3-directional-solenoid control valve 5 whose first shifting position is intended for the pressure oil inlet, whose second and centrally located shifting position, respectively, closure position is intended for the decoupling, respectively, interrupted of driving and adjusting moment for the timing device 3 and whose third shifting position is intended for the pressure oil return. The solenoid valve 9 is controlled synchronously in rotation and phase by an electronic control apparatus 14 of any conventional type by way of an electric line 15. The respective engine shaft signal and pump shaft signal serve for the determination of rotational speed and phase displacement. Coordinated electric connections are designated by reference numerals 16 and 17.

In order to be able to adapt the closure duration to engine conditions, an input magnitude detecting the regulating travel (RW) of the fuel-adjusting member can additionally be used for the control apparatus 14 so that the closure duration can take place as a function of load (FIG. 4).

Figure 3:
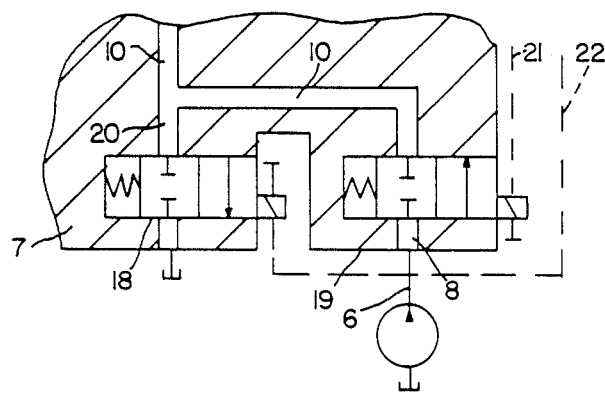
FIG. 3 is a somewhat schematic partial cross-sectional view of a further embodiment in accordance with the present invention with two 2/2-directional-solenoid control valves in the pump housing in accordance with the present invention.

An embodiment is illustrated in FIG. 3 in which the control unit is formed by two structurally identical shifting valves as 2/2-directional-solenoid control valves 18 and 19. Both solenoid valves 18 and 19 have each a shifting position for the closure as well as a further shifting position for the pressure oil return (left shifting valve 18) and the pressure oil inlet (right shifting valve 19). A return channel 20 branching off from the feed channel 10 is provided for the pressure oil return in which is located the solenoid valve 18.

The solenoid valves 18 and 19 are separately controllable by the electronic control apparatus 14 by way of electric lines 21 and 22.

In the embodiments according to FIGS. 4 and 5, the respective control units are accommodated in the respective flange body 23 and 24 which are secured directly at the pump housing 7 whereas in the embodiments according to FIGS. 6 and 7 they are arranged in the external, respectively, freely exposed feed line 6. Depending on the installation possibility in the engine space, the appropriate construction may be used. Essentially the same reference numerals are used for the different embodiments.

Figure 2:
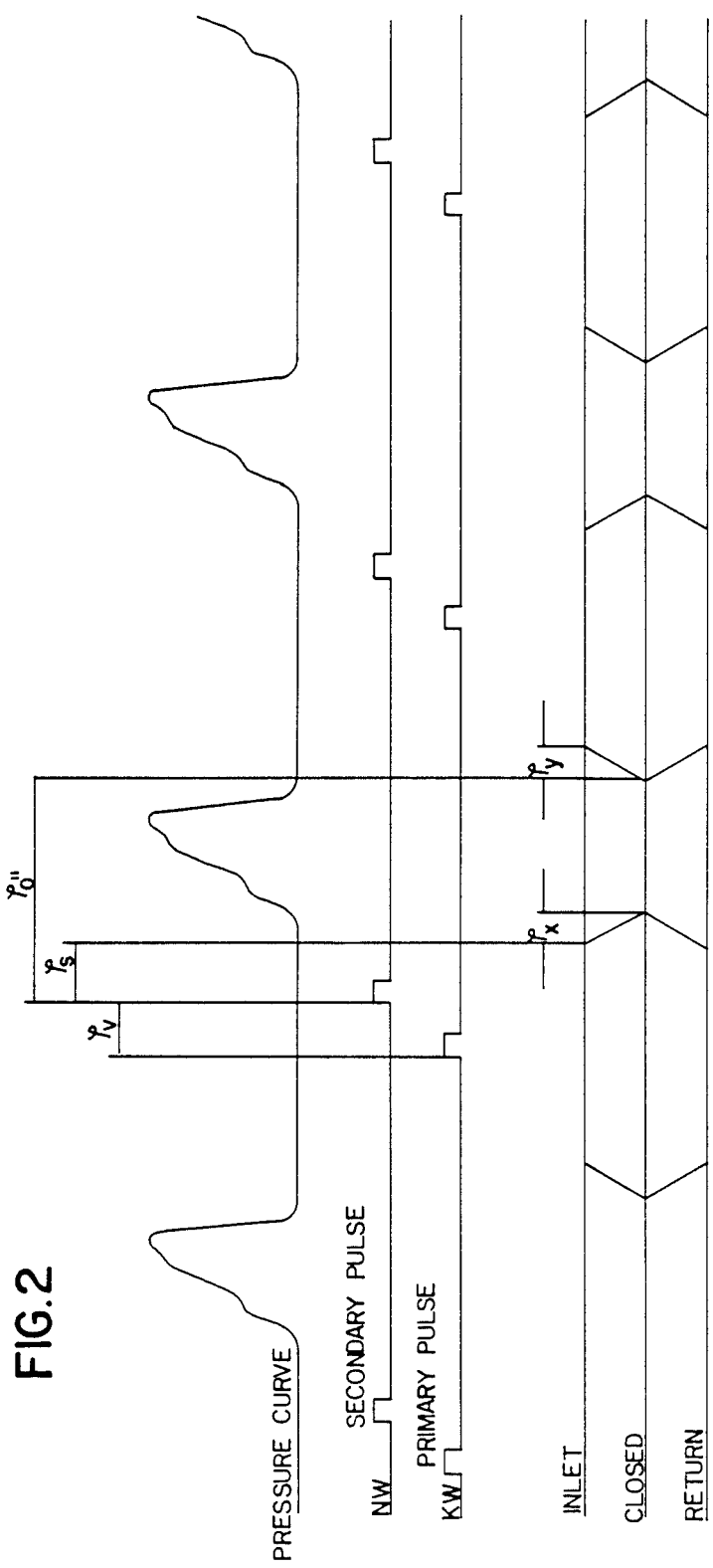
FIG. 2 is a diagram representing the pressure curve in the pressure space, the secondary pulses on the side of the cam shaft and the primary pulses on the side of the crankshaft as well as the different shifting positions of the solenoid valve in a system according to the present invention.

The operation of the control unit as concerns the embodiment according to FIGS. 1 and 2 is as follows:

As can be seen from FIG. 2, the adjusting angle $\phi_v$ is determined from the cam shaft secondary pulse (NW) and the crankshaft primary pulse (KW). Starting with the secondary pulse, the closing of the 3/3-directional-solenoid control valve 9 commences after the variable angle $\phi_s$ and the closure position is engaged at $\phi_x$ (about 1 ms). The solenoid valve 9 opens after the variable angle $\phi_o$ and the shifting position "inlet open" or "return open" is reached at $\phi_y$ (about 1 ms). The pressure oil supply or return is maintained for such length of time until, triggered by the secondary pulse, the shut-off function is again superimposed on the adjusting function.

Translated to the 3/3-directional-solenoid control valve 9, the following shifting positions result by the control of the control apparatus.

With pressure oil feed at the instant of the injection, the 3/3-directional-solenoid control valve 9 is in the zero, respectively, closure position whereas it is adjusted between the injections into the through-flow position (left shifting position) insofar as the injection start has to be adjusted.

With pressure oil return during the injection, the solenoid valve 9 is in the zero position, possibly, in the return position, and it is shifted into the return position (right shifting position) between the injections.

Due to the fact that at the instant of the injection also a return position can be engaged—the hydraulic medium can thus pass through the control unit during return flow—the adjusting speed can be still further increased by superposition of return adjusting force and driving moment.

The operation of the control unit concerning the embodiment according to FIG. 3 is as follows:

With pressure oil supply during the injection, both 2/2-directional-solenoid control valves 18 and 19 are closed and the solenoid valve 18 is opened by the control apparatus 14 between the injection insofar as adjustments of the injection start take place.

With pressure oil return during the injection, both solenoid valves 18 and 19 are closed or the solenoid valve 19 is opened and between the injections the solenoid valve 19 is opened by the control apparatus 14.

The described operations also apply for the embodiments according to FIGS. 4, 5 and 6, 7.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A pressure oil feed arrangement for a hydraulically actuated injection timing device, cooperating with a fuel injection pump for the control of the beginning of injection within an operating cycle of a multi-cylinder, air compressing internal combustion engine, for determining the timing angle of said internal combustion engine, comprising:

flow control means in a line connected to said injection timing device for selectively connecting, in a shifting position, said injection timing device to pressure oil inlet flow or return flow to adjust the timing angle or blocking, in a closed position, said connection to said injection timing device to maintain the timing angle; and electronic control means for determining the timing angle from a primary pulse and a secondary pulse and controlling said flow control means to move to said closed position, from a shifting position for advancing the beginning of said injection, for duration starting from said secondary pulse and extending beyond said injection cycle, as a function of at least one of rotational speed and load, thereby interrupting advancement adjustment during injection cycles and assuring advancement adjustment being possible only between injection cycles.

2. A pressure oil feed arrangement according to claim 1, wherein said electric control means controls said flow control means for delaying the beginning of injection to said shifting position during said injection cycle.

3. A pressure oil feed arrangement according to claim 2, wherein said flow control means includes a first shifting position connecting said pressure oil inlet flow to said injection timing device for advancing, and a second shifting position connecting said pressure oil return flow to said injection timing device for delaying.

4. A pressure oil feed arrangement according to claim 1, wherein the primary pulse is a crankshaft pulse and the secondary pulse a cam shaft pulse.

5. A pressure oil feed arrangement according to claim 1, wherein the flow control means includes two separately controllable solenoid control valve means of which one solenoid control valve means has a shifting position for the pressure oil inlet and the other solenoid valve means has a shifting position for the pressure oil return and both solenoid valve means have a closure position.

6. A pressure oil feed arrangement according to claim 5, wherein the flow control means is located in a line section of a feed line extending in a pump housing of the injection pump.

7. A pressure oil feed arrangement according to claim 5, wherein the flow control means is secured as attachment structure at the pump housing of the injection pump.

8. A pressure oil feed arrangement according to claim 5, wherein the flow control means is arranged in an external line section of the feed line leading to the pump housing of the injection pump.

9. A pressure oil feed arrangement according to claim 1, wherein the flow control means is located in a line section of a feed line extending in a pump housing of the injection pump.

10. A pressure oil feed arrangement according to claim 1, wherein the flow control means is secured as attachment structure at the pump housing of the injection pump.

11. A pressure oil feed arrangement according to claim 1, wherein the flow control means is arranged in an external line section of the feed line leading to the pump housing of the injection pump.

* * * * *